United States Patent
Trehus et al.

(10) Patent No.: US 7,062,609 B1
(45) Date of Patent: Jun. 13, 2006

(54) METHOD AND APPARATUS FOR SELECTING TRANSFER TYPES

(75) Inventors: Eric Trehus, San Jose, CA (US); Kuan-Yuh Ko, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 09/957,563

(22) Filed: Sep. 19, 2001

(51) Int. Cl.
G06F 12/06 (2006.01)
G06F 13/14 (2006.01)

(52) U.S. Cl. ............... 711/141; 711/133; 711/163; 710/313; 709/236

(58) Field of Classification Search ............ 711/141, 711/133–135, 146, 154, 159, 163, 221; 710/3–4, 710/305, 306, 313; 709/224, 250
See application file for complete search history.

(56) References Cited

U.S. PATENT DOCUMENTS

| 5,632,021 | A | 5/1997 | Jennings et al. | 710/312 |
| 5,991,855 | A * | 11/1999 | Jeddeloh et al. | 711/146 |
| 6,412,047 | B1 * | 6/2002 | Shimizu et al. | 711/141 |
| 6,751,698 | B1 * | 6/2004 | Deneroff et al. | 710/317 |
| 2002/0174255 | A1 * | 11/2002 | Hayter et al. | 709/250 |
| 2003/0182591 | A1 * | 9/2003 | Ajanovic et al. | 713/600 |

* cited by examiner

Primary Examiner—Denise Tran
(74) Attorney, Agent, or Firm—Marger Johnson & McColl

(57) ABSTRACT

A transfer type selector selects a transfer type used for maintaining cache coherency according to address values used for accessing memory and is programmable so that different transfer types can be selected for different applications. In one embodiment, a table has different address ranges each having associated transfer types. Transfer type selection logic selects one of the transfer types associated with the address range containing the address in a memory transaction request.

45 Claims, 4 Drawing Sheets

| RANGE # | ADDRESS RANGE | REQUESTED TRANSFER TYPE | SELECTED TRANSFER TYPE |
|---|---|---|---|
| 1 | 94 (DESCRIPTOR BUFFERS) | READ<br>WRITE PARTIAL CL<br>WRITE FULL CL | CLEAN<br>FLUSH<br>KILL |
| 2 | 96 (PACKET BUFFER) | READ<br>WRITE PARTIAL CL<br>WRITE FULL CL | FLUSH<br>KILL<br>KILL |

METHOD AND APPARATUS FOR SELECTING TRANSFER TYPES

BACKGROUND OF THE INVENTION

Cache coherency is a vital issue in a shared-memory multiprocessor system. Cache coherency refers to providing an accurate and common view of memory to all devices that share the same memory system. To maintain coherency, snoopy protocols are used by processors to monitor, or snoop, a shared memory bus. The processors use the information snooped on the bus to ensure the memory is supplied with the latest modified data in cache.

In one example, a system controller maintains cache coherency between a processing unit and an Input/Output (I/O) device which masters transactions. The system controller is responsible for participating in the coherency protocol on behalf of the I/O device. The I/O device is unaware of a CPU cache, nor is it directly connected to the CPU bus.

A cacheline is the smallest granule of information about which coherency and validity within the cache is maintained. Typically a cacheline represents 32 bytes of data, but some systems could have finer granularity or courser depending upon the CPU architecture.

Different transfer types are used to maintain cache coherency. For example, a CLEAN transfer type is used for memory reads between 1–32 bytes. For a CLEAN transfer type, any modified data in the CPU cacheline is written to memory, and returned to the reading device. A FLUSH transfer type is used for memory writes between 1–31 bytes. The FLUSH causes any modified data in the CPU cache to be written to memory, the cacheline then becomes invalid. A KILL transfer type is used for writes of 32 bytes. The KILL transfer type causes the CPU cacheline to become invalid.

As described above, when a partial cacheline is being written into memory, the FLUSH transfer type is used. However, if the modified copy in cache is unimportant to the system, the KILL transfer type would be preferred, since the KILL transfer type invalidates the cacheline without the processor first having to store the contents of the cacheline into memory. The problem is that there is no way of telling when the modified copy in the cache is important.

Another problem occurs when a device reads from memory and the processor finds a hit for that cacheline. The processor will CLEAN its cache by updating memory while keeping the cacheline valid. This leaves the cacheline in an Exclusive state where the memory and the cacheline contain the same contents. However, in some situations it may be preferred to invalidate the cacheline so that it can be used to store other data.

The present invention addresses this and other problems associated with the prior art.

SUMMARY OF THE INVENTION

A transfer type selector selects a transfer type used for maintaining cache coherency according to address values used for accessing memory and is programmable so that different transfer types can be selected for different applications.

DETAILED DESCRIPTION OF THE INVENTION

Figure 1:
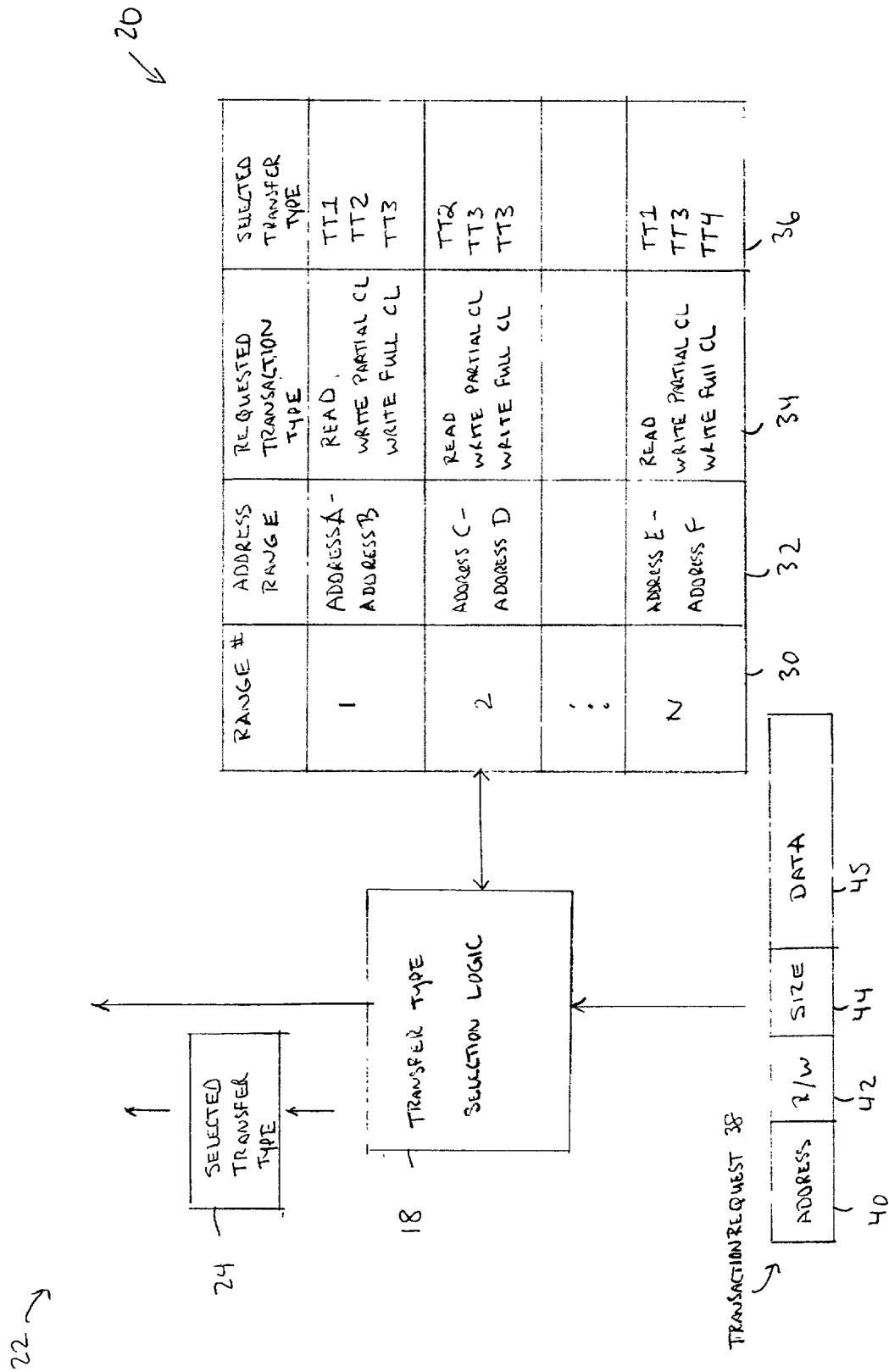
FIG. 1 is a block diagram of transfer type selection logic.

A transfer type selector 22 includes Transfer Type Selection (TTS) logic 18 and a table 20. The TTS logic 18 detects transaction requests 38 made by a device (not shown). The transaction request 38 comprises either a request to read data or a request to write data. The transaction request 38 includes an address 40, a read or write (R/W) field 42, possibly a size field 44, and a data field when the transaction request 38 requests to write data into memory. The address 40 is used to identify a location in memory. The R/W field 42 indicates weather the transaction request is for reading data from memory "R" or writing data to memory "W". The size field 44 indicates how much data is to be transferred.

The table 20 identifies different Transfer Types (TTs) 36 associated with different address ranges 32. Any number of address ranges 32 can be programmed into the table 20. There are different read and write parameters 34 associated with each address range 32. Some of the read/write parameters 34 may have associated transaction sizes and some may not. For example, address range #1 contains a "Read" category 34. This refers to a read transfer and does not care about the read size. Address range #1 also includes a "Write Partial CL" category. This refers to a write transaction that is less than a full cacheline. In the same address range #1, there is a "Write Full CL" category that refers to a write transaction that is a full cacheline long.

Each read/write category 34 has an associated transfer type 36. The specific address ranges 32, read and write categories 34 used for each address range 32, and the associated transfer types 36 are application dependant. Software is used during initialization to program the specific parameters 30, 32, 34 and 36 used in table 20.

The TTS logic 18 selects one of the transfer types 36 in table 20 according to the address 40, the R/W field 42, and possibly the size 44 in the transaction request 38. For example, a read transaction request 38 may include an address value 40 within address range #1 of table 20. The TTS logic 18 identifies TT#1 in table 20. For a partial cacheline write within the same address range #1, the TTS logic 18 selects transfer type TT#2. The TTS logic 18 selects a transfer type TT#3 for a full cacheline write within the same address range #1.

The transfer types 36 selected by the TTS logic 18 are different for transaction requests 38 within address range #2. For example, a read transaction request 38 within address range #2 uses transfer type TT#2 while a write transaction request 38 within address range #2 uses a transfer type TT#3. In address range #2, the transfer type is the same (TT#3) for partial cacheline writes and full cacheline writes.

Any combination of the address range 40, R/W request type 42, and transaction size 44 can be used for selecting the transfer type 36. By selecting the transfer type 24 according to the address 40, the TTS logic 18 prevents unnecessary writes or reads between cache 14 memory while at the same time freeing up more cachelines. The transfer types that are selected for different transaction requests are programmable by changing the parameters in table 20.

Figure 2:
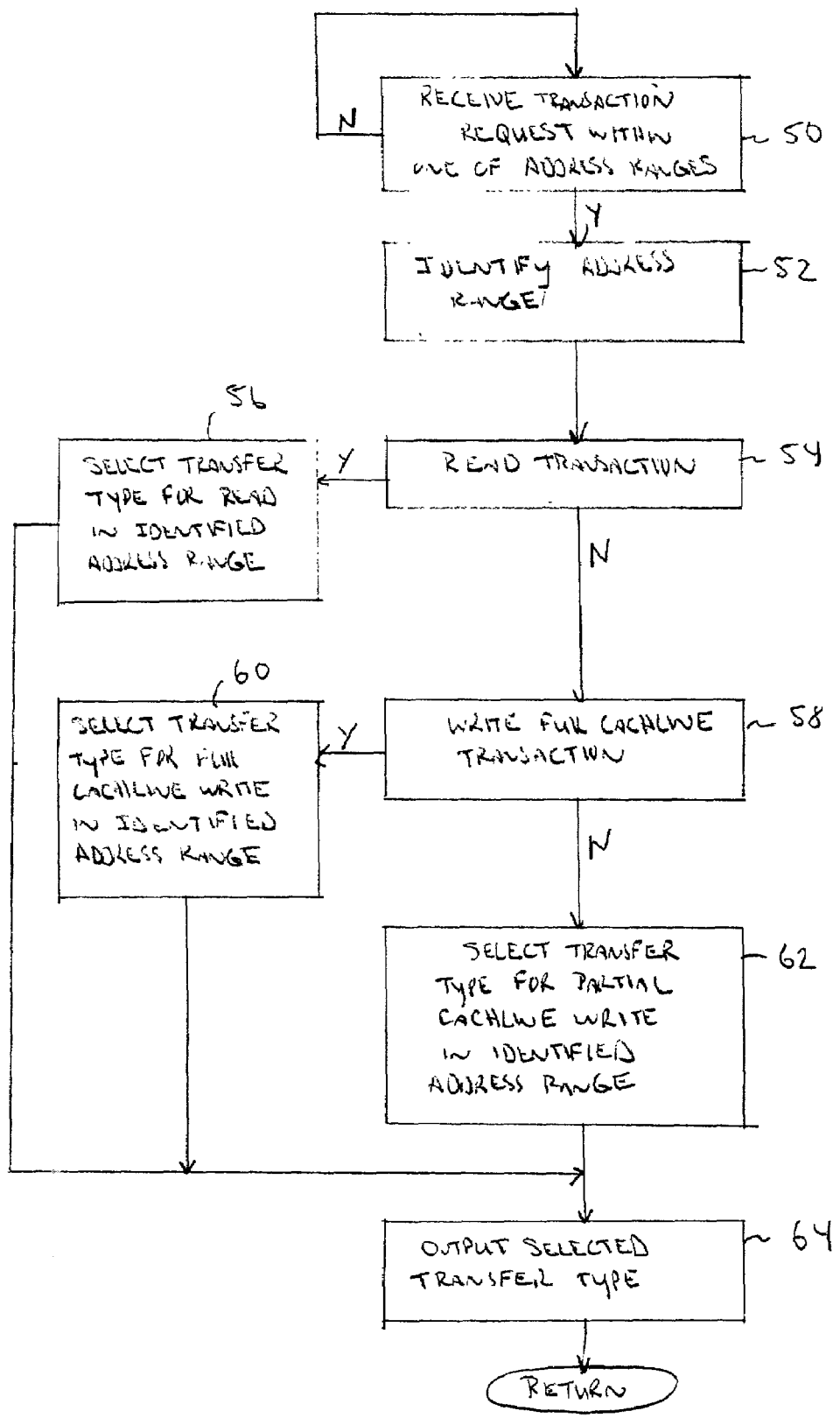
FIG. 2 is a flow diagram showing how the transfer type selection logic operates.

FIG. 2 is a block diagram showing in further detail how the TTS logic 18 operates. A transaction request within one of the address ranges in table 20 (FIG. 1) is received by the TTS logic in box 50. The address range containing the address is identified in box 52. If a read transaction request is identified in box 54, then the transfer type associated with the read in the identified address range is selected in box 56. If a write full cacheline transaction request is identified in box 58, then the transfer type in the identified address range associated with the write full cacheline is selected in box 60. Otherwise the TTS logic 18 selects the transfer type for the write partial cacheline in the identified address range in box 62. The selected transfer type is output in box 64.

Application Examples for Transfer Type Selection Logic

The TTS logic 18 can map any device access request with any transfer type by using addresses for determining transfer types. For some applications, Read With Intent To Modify (RWITM) may be substituted for FLUSH depending on the transaction request address. This may yield better results when reservations must be cleared.

In another example, an address range in memory is given exclusive ownership to a device. The range of memory is an integral number of cachelines. Rather then using FLUSH or RWITM for writes, a KILL transfer type is used, since whatever is in the CPU cache must be unimportant. This saves bandwidth on the data bus and memory interface by not having to update memory with unimportant data.

In another example, the cacheline is invalidated whenever a device is reading from memory. This could be beneficial, for example, when the device is reading a packet for transmission. By using a FLUSH transfer type instead of CLEAN, the cacheline is invalidated earlier. However this only makes sense when it is known that the CPU is unlikely to access the same cacheline in the near future.

These last two examples can be performed using the address in the transaction request to make an intelligent decision about when it is safe or desirable to use alternative transfer types to achieve desirable results. Using KILL in place of FLUSH can lead to loss of data. By selecting transfer types according to the transaction request address, KILL can replace FLUSH for some address ranges when the data in the cacheline is known to be unimportant. The KILL will not replace FLUSH in other address ranges where the data may be important. These transfer type selections can be reprogrammed depending upon the application requirements.

Packet Processing

Figure 3:
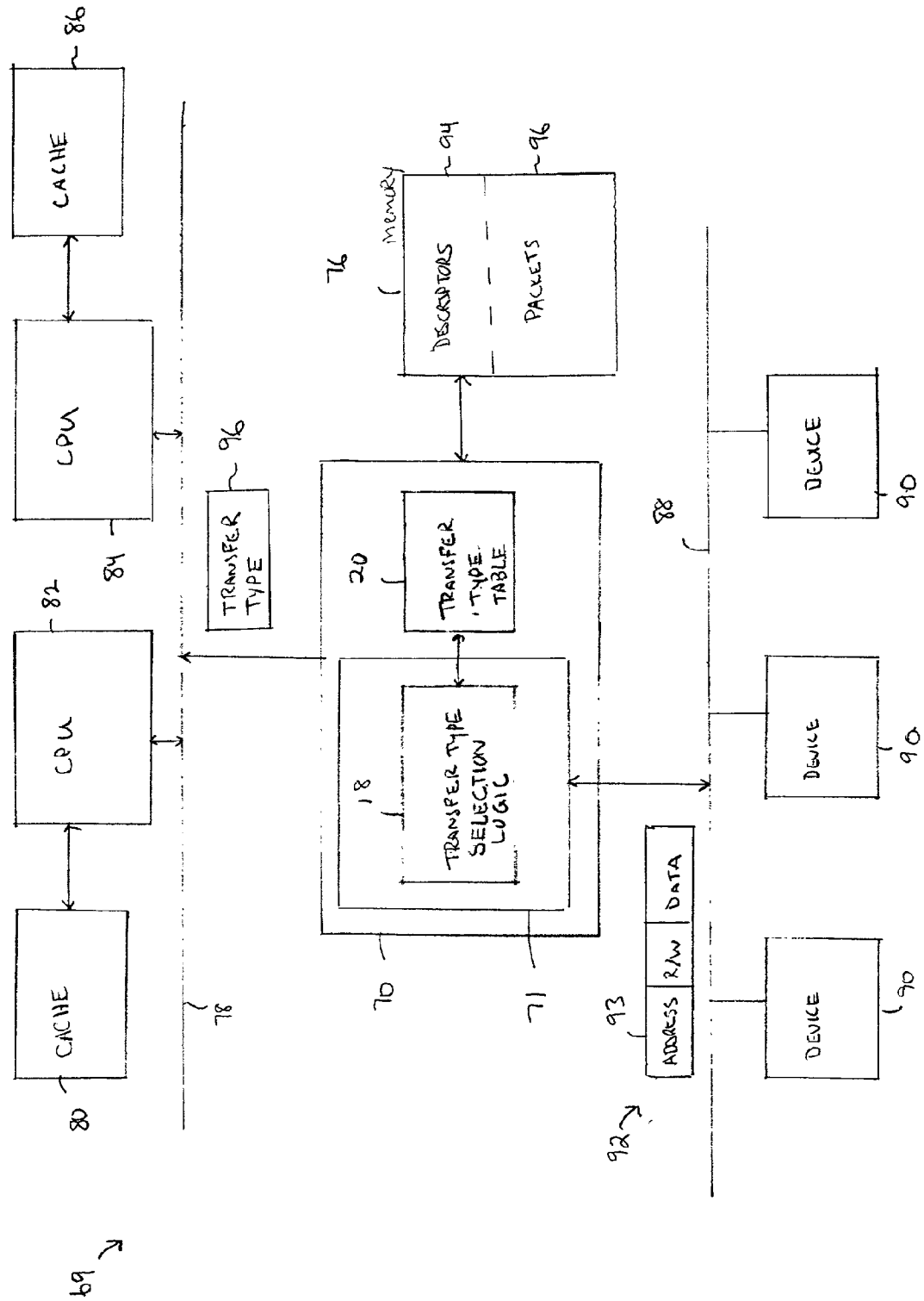
FIG. 3 is a block diagram showing an implementation of the transfer type selection logic in a network processing device.
Figure 4:
FIG. 4 shows the programmable contents of a transfer type table used in the network processing device shown in FIG. 3.

FIGS. 3 and 4 show an example of how the transfer type selection logic 18 is used in a system controller 70 for a network processing device 69. The system controller 70 interconnects together a bus 88, a memory 76, processors 82 and 84 and other devices. In one example, the bus 88 is a PCI bus that uses a Peripheral Component Interconnect (PCI) protocol. A description of the PCI bus is available from the PCI Special Interest Group, 5200 Elam Young Parkway, Hillsboro, Oreg.

In one example, the CPUs 82 and 84 are PowerPCs® made by Motorola, Inc. and the bus 78 is an MPX bus. Of course other processors and bus protocols can be used that allow the transfer of information and data between CPUs 82 and 84 and the system controller 70. The processors 82 and 84 are coupled to caches 80 and 86, respectively. While two processors 82 and 84 are shown in the network processing device 69, there can be more or less than two processors on bus 78. In one example, the memory 76 is a Synchronous Dynamic Random Access Memory (SDRAM), but one or more different memories internal or external to the system controller 70 can be used. The system controller 70 may also have multiple PCI buses. Each PCI interface can have its own associated Transfer Type Selection logic 18 and table 20.

There are PCI devices 90 that communicate over the PCI bus 88 to the system controller 70. The PCI devices can be any computer, peripheral device, network interface device, or other I/O device. The PCI devices 90 at times operate as masters on the PCI bus 88 and at other times operate as targets on the PCI bus 88. In one example, one or more of the devices 90 is a Medium Access Controller (MAC) card or other network interface card that couples the network device 69 to one or more Ethernet or other networks.

The system controller 70 acts as an agent for running address tenure on behalf of the PCI masters. Address tenure refers to putting an address and transfer type out on the address portion of the CPU bus 78. This allows the CPUs 82 and 84 to determine if the address is in its cache and whether the memory address needs to be updated or the cacheline retired.

A PCI interface 71 within the system controller 70 serves as both a master and a target for PCI transactions. However, the PCI interface 71 is never both the master and target of the same PCI transaction. A target portion of the PCI interface 71 contains the transfer type selection logic (TTS) 18.

In the description below, one or more of the devices 90 is an Ethernet controller. The Ethernet controller 90 receives packets coming in over a network (not shown). The Ethernet controller 90 makes a request to the system controller 70 to write the packets into memory 76. The system controller 70 takes the request from the Ethernet controller 90 and buffers them while running the selected transfer type request on the CPU address bus 78. The TTS logic 18 in the system controller 70 determines if the address is contained within one of the different address ranges in table 20. If an address range is identified, the TTS logic 18 selects the appropriate transfer type in the identified address range. The selected transfer type is output on the bus 78.

The CPU's 82 and 84 snoop the request, and send more recent data to memory 76 and/or invalidate their caches 80 and 86. After this, the PCI interface 71 in the system controller 70 makes a request and writes the packets into memory 76. The system controller 70 breaks the stream of packets into blocks. In one example, the blocks are 32 bytes long, however the blocks could be different sizes in different system architectures.

Transfer Types

There are several different transfer types associated with a PowerPC processor. The transfer type descriptions below are not a complete list and not necessarily the same transfer types that may be used for other processors. However, for simplicity, only the following transfer types will be described and used for illustrative purposes.

A CLEAN transfer type tells the CPUs 82 and 84 that if the cacheline exists in a modified state, to write the cacheline to memory, and mark the cacheline as Exclusive (indicating present, and not modified). After the CPUs 82 or 84 perform the CLEAN, the data in the cacheline and the associated addresses in memory 76 are the same. The CLEAN transfer type is typically used when data is read from memory 76.

A FLUSH transfer type tells the CPUs 82 and 84 that if the cacheline exists in a modified state, to write the cacheline to memory. Regardless of the previous state, the cacheline is marked invalid. The FLUSH transfer type is typically used when only part of a cacheline worth of data is written into memory 76. The KILL transfer type tells the CPUs 82 and 84 to invalidate whatever cacheline is associated with the address. A cacheline that is not in the CPU cache is invalid by definition.

For packet writes, it has been discovered that typically an entire cacheline of data, or more, is written into memory 76 at once. Anything in the memory 76 and caches 80 or 86 for these packet writes is invalid from a coherency standpoint. It is irrelevant if the caches 80 and 86 have data that is newer than what is currently stored in memory 76. That is because the packet data from the device 90 will overwrite whatever is in memory or in caches 80 or 86 for that particular address.

The system controller 70 normally would not know that these packet addresses are invalid. However, packet data is stored in predefined address ranges in memory 76. By associating the known packet data address ranges with particular transfer types, the TTS logic 18 can identify packet transfers and accordingly select KILL transfer types for packet writes.

Some memory locations 94 in memory 76 are preallocated for storing descriptors. Descriptors usually include various control parameters, packet length information, flags, etc. that are used for processing and locating packet data in memory 76. The descriptors may be less than 32 bytes long. Therefore, for partial cacheline descriptor writes, the TTS logic 18 may select a FLUSH transfer type. For descriptor writes for a full cacheline, the TTS logic 18 selects a KILL transfer type.

The table 20 shown in more detail in FIG. 4 is programmed for processing these packet transfers as described above. Range #1 in FIG. 4 specifies the address range of descriptor buffer section 94 in memory 76. Range #2 in FIG. 4 specifies the address range for packet buffer section 96 in memory 76. A descriptor read request for address range #1 is associated with a CLEAN transfer type. A partial cacheline descriptor write is associated with a FLUSH transfer type and a full cacheline descriptor write is associated with a KILL transfer type.

This example requires that packet buffers 96 are aligned on cacheline boundaries, and that the packet buffers 96 are an integral number of cachelines in size. Further, by convention, when a buffer is given to the device 90 for packet reception via the descriptor read, it is assumed that the entire descriptor buffer section 94 has no useful data within it until filled by the device 90.

For accesses to packet buffer section 96, a FLUSH transfer type is programmed in table 20 when the device 90 reads from memory 76 (ie, the device 90 is transmitting the packet). This forces the cachelines to become invalid, thus making is possible to reuse the cacheline resource earlier. The KILL transfer type is used when the device 90 indicates writing a partial cacheline or a full cacheline of packet data to packet buffer section 96 in memory 76. This prevents the CPUs 82 and 84 from having to write modified contents in their caches to memory 76.

The TTS logic 18 reduces the amount of data that needs to be sent over the bus 78 for cache updating. The TTS logic 18 also increases the availability of the caches lines by more intelligently invalidating data in the cache. This could reduce thrashing in the cache.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system, comprising:
   transfer type selection logic that selects a transfer type used for maintaining cache coherency according to an address in a memory transaction request wherein the transfer type selection logic selects from a first group of transfer types associated with descriptor data and selects from a second group of transfer types associated with packet data, the transfer type selection logic further selecting one of the transfer types according to a requested transaction type and a transaction size; and
   a table having different address ranges each having multiple different associated transfer types for both the first and second group, the transfer type selection logic selecting between the multiple transfer types according to a type and size of memory transaction request.

2. The system according to claim 1 where the transfer type is specified for a read transaction for a specific address range.

3. The system according to claim 2 where the specified address range is programmable for the read transaction.

4. The system according to claim 1 where the address for the transfer type is programmable.

5. The system according to claim 1 wherein the transfer type includes any one of a KILL, FLUSH, or CLEAN coherency transfer type.

6. The system according to claim 1 including multiple CPUs on a CPU bus that each provide cache coherency with the memory according to the selected transfer types.

7. The system according to claim 1 wherein the transfer type selection logic is implemented in a network processing device.

8. A system, comprising:
   transfer type selection logic that selects a transfer type used for maintaining cache coherency according to an address in a memory transaction request wherein the transfer type selection logic selects from a first group of transfer types associated with descriptor data and selects from a second group of transfer types associated with packet data;
   wherein the transfer type is specified for a write transaction that is a partial cacheline in size for a specific address range and a table having different address ranges each having multiple different associated transfer types for both the first and second group and the transfer type selection logic selects between the multiple transfer types according to a type and size of memory transaction request.

9. The system according to claim 8 where the specified address range is programmable for the partial cacheline write transaction.

10. The system according to claim 9 where a transfer type is specified for a write transaction that is a full cacheline in size for a specific address range.

11. The system according to claim 10 where the address range is programmable for the full cacheline write transaction.

12. A method for selecting transfer types, comprising:
monitoring an address value used for accessing a storage device;
selecting a transfer type used for maintaining cache coherency according to the address value used in a transaction request for accessing the storage device;
associating packet transactions with a first set of multiple different transfer types and selecting one of the first set of transfer types according to a type and size of the transaction request and when the transaction request is for accessing a memory location storing packet data; and
associating descriptor transactions with a second set of multiple different transfer types and selecting one of the second set of transfer types according to a type and size of the transaction request and when the memory transaction request is for accessing a memory location storing descriptor data; and
a table having different address ranges each having multiple different associated transfer types for both the first and second set, a transfer type selection logic selecting between the multiple transfer types according to a type and size of memory transaction request.

13. The method according to claim 12 including:
associating a first set of transfer types with a first address range;
associating a second set of transfer types with a second address range;
selecting one of the first set of transfer types when the address value of the transaction request is within the first address range; and
selecting one of the second set of transfer types when the address value of the transaction request is within the second address range.

14. The method according to claim 12 including selecting the transfer type according to the address value and a memory transaction size in the transaction request.

15. The method according to claim 12 including selecting the transfer type according to the address value and a type of read or write transaction in the transaction request.

16. The method according to claim 12 including using a KILL transfer type for writing packet data and a FLUSH transfer type for writing descriptor data.

17. The method according to claim 12 including receiving the transaction request from a PCI bus and sending the selected transfer type to a CPU bus.

18. A system controller, comprising:
a first interface for coupling to a central processor unit (CPU) bus;
a second interface for coupling to a Peripheral Component Interconnect (PCI) bus;
a third interface coupled to memory;
a table including different address ranges having different read/write transaction categories and different transaction size categories associated with different transfer types; and
logic that is programmable to select the different transfer types for transaction requests on the PCI bus, the programmable logic then outputting the selected transfer type to the CPU bus.

19. The system controller according to claim 18 including a software configurable table used by the logic for programmably selecting different transfer types.

20. The system controller according to claim 18 wherein the transaction requests are generated by a PCI device coupled to the PCI bus.

21. The system controller according to claim 18 wherein the logic selects the transfer types according to address values in the transaction requests.

22. A system for selecting transfer types, comprising:
means for monitoring an address value used for accessing a storage device;
means for selecting the transfer type used for maintaining cache coherency according to the address value used in a transaction request for accessing the storage device;
means for associating packet transactions with a first set of multiple different transfer types and selecting one of the first set of transfer types according to a type and size of the transaction request and when the transaction request is for accessing a memory location storing packet data; and
means for associating descriptor transactions with a second set of multiple different transfer types and means for selecting one of the second set of transfer types according to a type and size of the transaction request and when the memory transaction request is for accessing a memory location storing descriptor data; and
a table having different address ranges each having multiple different associated transfer types for both the first and second set, a transfer type selection logic selecting between the multiple transfer types according to a type and size of memory transaction request.

23. The system according to claim 22 including:
means for associating a first set of transfer types with a first address range;
means for associating a second set of transfer types with a second address range;
means for selecting one of the first set of transfer types when the address value of the transaction request is within the first address range; and
means for selecting one of the second set of transfer types when the address value of the transaction request is within the second address range.

24. The system according to claim 22 including means for selecting the transfer type according to the address value and a memory transfer size in the transaction request.

25. The system according to claim 22 including means for selecting the transfer type according to the address value and a type of read or write transaction in the transaction request.

26. The system according to claim 22 including means for using a KILL transfer type for writing packet data and a FLUSH transfer type for writing descriptor data.

27. The system according to claim 22 including means for receiving the transaction request from a PCI bus and sending the selected transfer type to a CPU bus.

28. Computer code stored on a computer readable medium, comprising:
code for monitoring address values used for accessing a storage device; and code for selecting transfer types used for maintaining cache coherency according to the address values used in transaction requests for accessing the storage device;
code for associating packet transactions with a first set of multiple different transfer types and selecting one of the first set of transfer types according to a type and size of the transaction request and when the transaction request is for accessing a memory location storing packet data; and
code for associating descriptor transactions with a second set of multiple different transfer types and selecting one of the second set of transfer types according to a type and size of the transaction request and when the transaction request is a memory location storing descriptor data; and
code for associating a table having different address ranges each having multiple different associated transfer types for both the first and second set, a transfer type selection logic selecting between the multiple transfer types according to a type and size of memory transaction request.

29. Computer code according to claim 28 including:
code for associating a first set of transfer types with a first address range;
code for associating a second set of transfer types with a second address range;
code for selecting one of the first set of transfer types when the address value of the transaction request is within the first address range; and
code for selecting one of the second set of transfer types when the address value of the transaction requests is within the second address range.

30. Computer code according to claim 28 including code for selecting the transfer type according to the address value and a memory transaction size in the transaction request.

31. Computer code according to claim 28 including code for selecting the transfer type according to the address value and a type of read or write transaction in the transaction request.

32. Computer code according to claim 28 including code for using a KILL transfer type for writing packet data and a FLUSH transfer type for writing descriptor data.

33. Computer code according to claim 28 including code for receiving the transaction request from a PCI bus and sending the selected transfer type to a CPU bus.

34. A controller, comprising:
a first interface for coupling to a central processor unit (CPU) bus;
a second interface for coupling to a second bus;
a third interface coupled to memory;
a table including different address ranges having different read/write transaction categories and different transaction size categories associated with different transfer types; and
a processor configured to select the different transfer types from the table for transaction requests on the second bus and then outputting the selected transfer type to the CPU bus.

35. The system controller according to claim 34 wherein the processor selects the transfer types according to address values and transaction sizes in the transaction requests.

36. The system controller according to claim 34 wherein the table is software configurable and used by the processor for programmably selecting different transfer types.

37. The system controller according to claim 34 wherein the transaction requests are generated by a device coupled to the second bus.

38. A memory access system, comprising:
a table including different address ranges having different read/write transaction categories and different transaction size categories associated with different transfer types; and
transfer type selection logic configured to select one of the different transfer types in the table according to an address, read/write indicator and transaction size indicator in a memory transaction request.

39. The system according to claim 38 wherein the transfer type selection logic selects from a first group of transfer types associated with a first type of packet data and selects from a second group of transfer types associated with a second type of packet data.

40. The system according to claim 38 wherein the transfer type selection logic selects from a first group of transfer types associated with packet descriptor data and selects from a second group of transfer types associated with packet data.

41. The system according to claim 38 wherein the transfer type selection logic selects from a first group of transfer types associated with a full cacheline transaction and selects from a second group of transfer types associated with a partial cacheline transaction.

42. A circuit, comprising:
transfer type selection logic that selects a transfer type used for maintaining cache coherency according to an address in a memory transaction request wherein the transfer type selection logic selects from a first group of multiple different transfer types associated with different address ranges for a first type of packet data and selects from a second group of multiple different transfer types associated with different address ranges for a second different type of packet data, the transfer type selection logic further selecting one of the transfer types according to a transaction request of a partial cacheline or a full cacheline and according to a type and size of memory transaction request; and
a table having different address ranges each having multiple different associated transfer types for both the first and second group, the transfer type selection logic selecting between the multiple transfer types according to a type and size of memory transaction request.

43. The circuit according to claim 42 where the first type of packet data is associated with descriptor data and the second type of packet data is associated with packet payload data.

44. The circuit according to claim 42 wherein the selection logic selects the transfer types according to address values, transaction types, and transaction sizes in the transaction request.

45. A circuit, comprising:
transfer type selection logic that selects a transfer type used for maintaining cache coherency according to an address in a memory transaction request wherein the transfer type selection logic selects from a first group of transfer types associated with a first type of packet data and selects from a second group of transfer types associated with packet data; and
a table including different address ranges having different read/write transaction categories and different transaction size categories associated with different transfer types,
the transfer type selection logic selecting one of the transfer types associated with the address range containing the address in the memory transaction request.

* * * * *